3,383,219
WHIPPABLE FAT COMPOSITIONS
Bernard A. Patterson, 4040 N. LeClaire,
Chicago, Ill. 60641
No Drawing. Filed June 4, 1964, Ser. No. 372,672
5 Claims. (Cl. 99—118)

ABSTRACT OF THE DISCLOSURE

A free-flowing particulated fat composition including a dried emulsion of an emulsifier composition and a fat coated with a proteinaceous material such as sodium caseinate, the emulsifier composition containing both an emulsifier having at least 90% edible monoglycerides and another emulsifier having at least 40% edible diglycerides.

The present invention relates to improvements in whippable fat compositions, of the type in which the fat particles are coated or encapsulated in a proteinaceous material.

There is a wide field of use for dry fat compositions which are stable upon storage and which can carry substantial amounts of sugar. Such compositions find use in a wide variety of food products including toppings, cake mixes, and pastry mixes. Some compositions of this type, however, have the difficulty that they would "bleed" through the encapsulating material. Others, when reconstituted with milk and additional sugar, did not have the taste or texture of the whipped cream which they were supposed to replace. In many cases, the taste of the composition was rather greasy and objectionable on that account.

Some compositions of this type, particularly those containing lacto-palmitates in combination with glycerides caused a poor flavor in the composition, instead of the bland flavor which is necessary. Some compositions suggested for use as reconstituted whipped toppings provide little overrun on whipping. In the dried form, these materials require excessive whipping periods, detracting from their salability.

With the foregoing in mind, an object of the present invention is to provide an improved free flowing particulated fat composition containing a dried emulsion of a fatty material coated with a proteinaceous material.

Another object of the invention is to provide a free flowing particulated fat composition which has excellent overrun characteristics, which can carry substantial amounts of sugar, and which does not provide the objectionable greasy taste characteristic of so many products in this field.

A further object of the invention is to provide an improved dry fat composition with an improved combination of emulsifying agents to provide a stable composition with a bland flavor and the ability to carry substantial amounts of sugar.

In accordance with the present invention, I provide a free flowing particulated fat composition including a dried emulsion of an emulsifying composition and a fat coated with a proteinaceous material, the emulsifying composition containing both an emulsifier having a relatively large content of edible monoglycerides and an emulsifier having a relatively large content of edible diglycerides. The combination of the two emulsifying agents has been found to achieve results not possible with the use of each emulsifying agent individually. Specifically, the use of the relatively low melting diglycerides in combination with the "hard" monoglycerides, and in combination with a suitable fat provides a composition which can be readily reconstituted in milk, or in other compositions wherein it is necessary to release the fat and the sugar properly into the surrounding medium. The compositions are characterized by substantial overrun, ease of whippability, stability upon standing, and a completely bland taste. What is more, the encapsulated fat exhibits no tendency to bleed through the encapsulating material. All this is accomplished without the production of a greasy flavor which has sometimes characterized compositions of ths nature heretofore.

The fat material employed with the composition of the present invention can be any of the shortening type fats which have heretofore been employed for this purpose. For example, the fat material may be hydrogenated vegetable oils, modified lards, hydrogenated coconut oil, and the like. In order to provide the best texture in the mouth, with lack of after-taste, I find it advisable to use a mixture of hydrogenated coconut oils, one of which melts at about 92° F. and the other at about 100° F., using amounts of both to provide an average melting point of about 98° F. in the composition. Since this represents the approximate body temperature, or slightly below, the composition is rendered fluid in the mouth instead of coating the oral cavity and the throat.

The encapsulating proteinaceous material may also be selected from a wide list. Suitable materials include soy protein, egg albumin, non-fat milk solids, whey solids, gelatin, partially hydrolyzed fish protein, buttermilk solids, whole eggs, and egg yolks. By far the most preferred materials in this connection, however, is sodium caseinate, as this material provides greater stability over extended temperature ranges than any of the other proteinaceous materials mentioned.

The sugar added to the composition is preferably sucrose but can be materials such as corn sugar and dried invert sugars.

The emulsifiers used in accordance with the present invention consist of a mixture of a first emulsifier preferably containing at least 90% edible monoglycerides, and a second emulsifier containing preferably at least 40% edible diglycerides, the mono- and diglycerides each being esters of aliphatic carboxylic acids containing from 12 to 22 carbon atoms per molecule. In order to provide suitable melting characteristics in the composition, it is desirable that the emulsifier containing substantial amounts of the diglycerides have a melting point below about 130° F.

There are several suitable glyceride compositions presently available for use in conjunction with the improved particulated fat compositions of the present invention. Among the monoglyceride type emulsifiers which are available is "Myverol 18-00" which is made from hydrogenated lard. It has the following typical chemical and physical data:

Table I

| | |
|---|---|
| Monester content (min.) percent | 90 |
| Saponification value | 155–165 |
| Iodine value (max.) | 3 |
| Glycerol content (max.) percent | 1.0 |
| Free fatty acids (as stearic) (max.) do | 1.5 |
| Specific gravity (at 80° C.) | 0.91 |
| Congeal point ° F | 154 |
| Cloud point ° F | 156 |
| Clear point ° F | 163 |

Another suitable material is known commercially as "Myverol 18-07," derived from fully hydrogenated cottonseed oil. This material has the following typical chemical and physical data:

Table II

| | |
|---|---:|
| Monester content (min.) _____percent__ | 90 |
| Saponification value _____ | 155–165 |
| Iodine value (max.) _____ | 3 |
| Glycerol content (max.) _____percent__ | 1.0 |
| Free fatty acids (as stearic) (max.) ____do____ | 1.5 |
| Specific gravity (at 80° C.) _____ | 0.92 |
| Congeal point _____° F__ | 152 |
| Cloud point _____° F__ | 152 |
| Clear point _____° F__ | 169 |

A suitable diglyceride containing emulsifier for use in conjunction with the monoglyceride type emulsifier is known commercially as "Atmul 80" which has the following physical characteristics:

Table III

| | |
|---|---:|
| Melting point _____° F__ | 115–122 |
| Iodine value _____ | 56–64 |
| Monoglyceride content _____percent__ | 40–44 |
| Free fatty acids (as oleic) (max.) _____do____ | 0.4 |
| Free glycerine (max.) _____do____ | 0.6 |

All of the foregoing emulsifier compositions may contain typical preservatives such as butylated hydroxy anisol, butylated hydroxy toluene, and/or citric acid.

The best compositions produced according to the present invention contain, as dry solids, from 40 to 60% by weight of the combination of fat solids and emulsifiers, from 4 to 10% by weight of the proteinaceous coating material, and from 35 to 55% by weight sugar. The 40 to 60% content of fat solids and emulsifiers is distributed such that 6 to 15% by weight of the final composition consists of the emulsifiers. In turn, the total emulsifier content is preferably broken up so that from 50 to 70% by weight of the combination of emulsifiers is the material containing substantial amounts of diglycerides, and the remaining 50 to 30% consists of the essentially monoglyceride type emulsifier. The total dry solids usually constitute 30 to 50% by weight of the total emulsion, with the remaining 50 to 70% being water.

In compounding the materials of the present invention, the fat materials are first melted and emulsified in a warm aqueous dispersion of the proteinaceous material by stirring. The sugar and other flavors or coloring matters are added, and the mixture is passed to a homogenizer until a completely uniform consistency is obtained, whereupon the materials are spray dried at temperatures on the order of 100° F.

It is also possible to eliminate much of the sugar of the composition at the time of initial mixing and spray drying, so that it may be added later along with additives such as chocolate, dry cheese, or peanut butter in making up a whipping composition.

The following specific example sets forth the particularly preferred dry solids composition in accordance with the present invention:

Table IV

| | Percent |
|---|---:|
| Fat solids plus emulsifiers (40% "Myverol" and 60% "Atmul 80") _____ | 48 |
| Sodium caseinate _____ | 5 |
| Sugar _____ | 47 |

The compositions of the present invention can be used in a wide variety of food products including cake mixes, whipped toppings, frozen desserts, sandwich spreads, mayonnaise type dressings, Hollandaise sauces, cheesecake mixes, and french pastry whips. In all cases, the compositions are characterized by excellent stability, bland flavor, and resistance to bleeding through the encapsulating material.

It should be evident that various modifications can be made to the described embodiments without departing from the scope of the present invention.

I claim as my invention:

1. A free flowing particulated fat composition comprising a dry emulsion of an emulsifier composition and a fat coated with a proteinaceous material, said emulsifier composition containing a mixture of from 30 to 50% by weight of a first emulsifier containing at least 90% edible monoglycerides and from 50 to 70% by weight of a second emulsifier containing at least 40% edible diglycerides, said second emulsifier having a melting point below about 130° F.

2. A free flowing particulated fat composition comprising a dry emulsion of an emulsifier composition and a fat coated with sodium caseinate, said emulsifying composition containing a mixture of from 30 to 50% by weight of a first emulsifier containing at least 90% edible monoglycerides and from 50 to 70% by weight of a second emulsifier containing at least 40% edible diglycerides, said second emulsifier having a melting point below about 130° F.

3. A free flowing particulated fat composition consisting essentially of from 40 to 60% by weight of a combination of fat solids and emulsifiers, from 4 to 10% of a proteinaceous coating material, and from 35 to 55% by weight sugar, said emulsifiers including a mixture of from 30 to 50% by weight of a first emulsifier having at least 90% edible monoglycerides and from 50 to 70% by weight of a second emulsifier containing at least 40% edible diglycerides.

4. A free flowing particulated fat composition consisting essentially of from 40 to 60% by weight of a combination of fat solids and emulsifiers, said emulsifiers being present in an amount of 6 to 15% by weight of said composition, said emulsifiers being a mixture of from 30 to 50% by weight of a first emulsifier having at least 90% by weight of a monoglyceride ester of an aliphatic acid containing 12 to 22 carbon atoms, and from 50 to 70% by weight of a second emulsifier containing at least 40% by weight of a diglyceride ester of an aliphatic acid containing 12 to 22 carbon atoms, said composition further containing from 4 to 10% by weight of sodium caseinate and 35 to 55% by weight of a sugar.

5. The composition of claim 4 in which said second emulsifier has a melting point below about 130° F.

References Cited

UNITED STATES PATENTS

| | | | |
|---|---|---|---|
| 3,042,530 | 7/1962 | Kidger | 99—123 |
| 3,098,748 | 7/1963 | Noznick | 99—139 |

RAYMOND N. JONES, *Primary Examiner.*

A. LOUIS MONACELL, *Examiner.*

J. M. HUNTER, *Assistant Examiner.*